Dec. 1, 1959 W. J. KRESKE 2,915,327
LOCKING MECHANISMS FOR TELESCOPING MEMBERS
Filed June 30, 1953
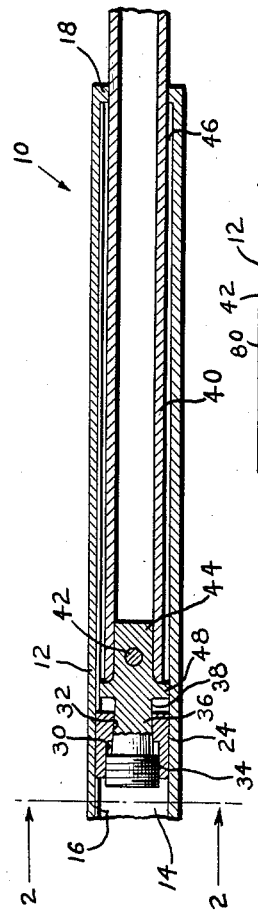
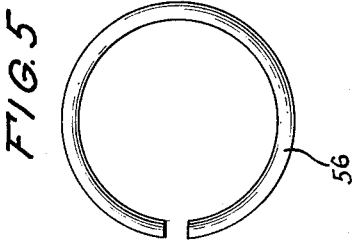
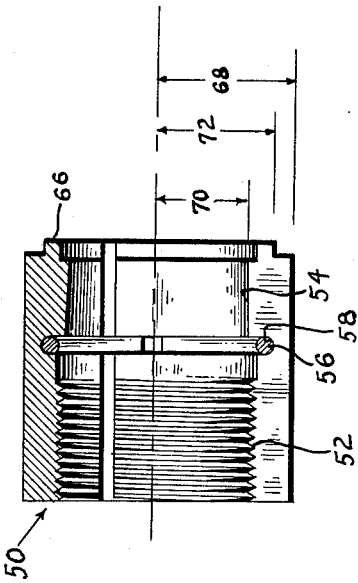
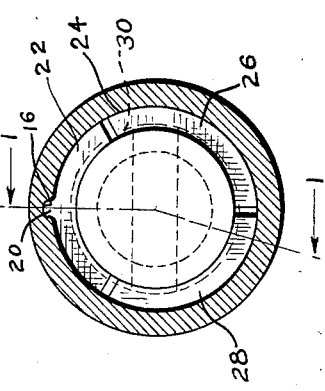
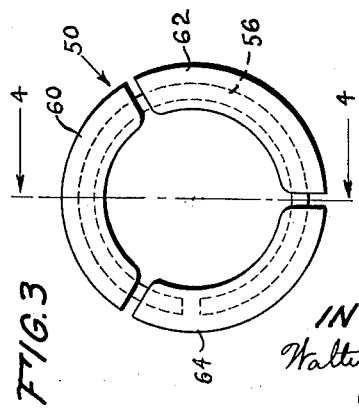
INVENTOR
Walter J Kreske

United States Patent Office 2,915,327
Patented Dec. 1, 1959

2,915,327

LOCKING MECHANISMS FOR TELESCOPING MEMBERS

Walter J. Kreske, Newton Center, Mass.

Application June 30, 1953, Serial No. 365,100

9 Claims. (Cl. 287—58)

This invention relates to locking mechanisms for telescoping members and is a continuation in part of application No. 205,973 filed January 15, 1951, now Patent No. 2,807,904, granted Oct. 10, 1957.

Because of the relative structural simplicity, economy, and ease of manufacture of cylindrical shapes, it is desirable that the engaging portions of telescoping members be substantially cylindrical in shape. However, the use of convenient cylindrical shapes in telescoping members presents difficult problems in the proper operation of expansible bushing type locking mechanisms used in adjustment of the telescoping members. Among the problems is one of preventing or limiting to a minimum radial slippage between the expansible bushing and the outer member of the telescoping members in the operation of locking the members together in a selected adjustment position. Another problem is that mechanisms of this type currently in use have a tendency to jam against the spindle or operating cam portion of the mechanism and consequently cause slippage at the bushing and outer telescoping member contact surfaces. Thereby the bushing fails to expand with sufficient force against the external telescoping member to lock both members together. Such jamming may necessitate disassembly of the entire mechanism to make the mechanism operable again.

These difficulties have been overcome in the present invention, which also has other desirable objects, features and advantages. One of these is a reduction in number of working components required in such locking mechanisms. Another is the achievement of a structure which withstands relatively high locking torques even with the use of relatively soft materials as aluminum. Still another is a locking structure which can withstand severe loads on the telescoping members even when extended to the maximum telescoping position. Still another is the extreme rapidity of clutching action with relatively small angular displacement between the telescoping members. Another is the achievement of a structure which lends itself to relatively simple, rapid and inexpensive manufacture. These and other features, objects and advantages will become more apparent from the following description taken in connection with the accompanying drawings of preferred embodiments of the invention and wherein:

Fig. 1 is a cross sectional view of one embodiment of the invention taken on line 1—1 of Fig. 2, Fig. 2 is an end view in enlarged scale taken on line 2—2 of Fig. 1, Fig. 3 is an end view in enlarged scale of expansible segments in a second embodiment of the invention, Fig. 4 is a cross sectional view taken on line 4—4 of Fig. 3, Fig. 5 is a plan view of a circular spring element used in the embodiment illustrated in Figs. 3 and 4, Fig. 6 is a cross sectional view of a third embodiment of the invention.

Referring to the drawings in more detail, Fig. 1 illustrates a first embodiment of the invention designated generally by the numeral 10. This embodiment is comprised of an outer tubular member 12 having a substantially cylindrical, hollow interior 14 running axially of the tubular member 12. An axially disposed groove 16, which may be of rectangular or other suitable cross sectional shape, is provided in the internal wall extending over the length of the tubular member 12, and terminating at one extremity at the inwardly projecting shoulder 18.

Slidably arranged in the groove 16 is a raised section or tongue 20 on the periphery of a segment 22 of a clutch or sleeve member 24 which is composed of two other segments 26 and 28. The sleeve member 24 has internal threaded portion 30 and conical camming portion 32 which coincide with the threaded end 34 and cone 36 of a spindle 38 fixed rigidly to the end of an internal telescoping member 40 as by a rivet pin 42 through the shank 44 of the spindle 38 and the wall of the internal telescoping member 40.

The internal telescoping member 40 is free to rotate and slide longitudinally at the shoulders 18 with ample clearance 46 between the periphery of the internal telescoping member 40 and the internal wall of the external telescoping member 12. A flange structure 48 of the spindle 38 provides suitable bearing against the internal wall of the external telescoping member 12 for assisting proper rotational and longitudinal movement of the internal telescoping member 40 regardless of the liberal clearance 46. The flanges 48 and 18 also provide a suitable stopping arrangement to limit the possible extension and adjustment of the internal telescoping member 40 and prevent it from being withdrawn from the external telescoping member 12 in the direction of the internally projecting flange 18. A useful function of the liberal clearance 46 is that even though the external telescoping member 12 or the internal telescoping member 40 receives substantial bends or bumps from rough usage, the legs will not jam and will continue to operate smoothly without interference of one member with the other.

In operation, a relative rotation between the outer telescoping member 12 and inner telescoping member 40 in one direction will cause a relative axial movement which will cause the conical surface 32 of the sleeve 24 to ride up on the cone 36 because of the screw threads 34 and 30. By this movement the cone 36 will force the segments of the sleeve 24 outwardly against the internal walls of the hollow portion 14 of the outer telescoping member 12. This outward force against the external telescoping member 12 produces a firm frictional locking action between the periphery of the sleeve 24 and the walls of the hollow portion 14. The intensity of the force or outward thrust must be relatively large for the locking action to be sufficiently great to withstand substantial axial loads on the telescoping members. For example, where an included angle of the cone 36 was 3 degrees and the threaded portions 34 and 30 had 28 threads per inch, a rotational torque on the internal telescoping member 40 of 25 pound inches (which is within the capabilities of exertion by a human being grasping these members with the hands) produces an outward or radial thrust of the sleeve 24 of approximately 1500 pounds. The frictional contact of such an outward thrust is capable of supporting axial loads on the telescoping members of over 150 pounds. However, the production of such relatively high radial thrust, particularly where soft materials as aluminum are desired in the locking mechanism, creates the problem of galling and erosion of material at the contact conical surface 32. This galling becomes particularly evident where the nature of the structure tends toward stress concentration. Such propensity is overcome in applicant's device by making the diameter of the conical surface 32 at the point of contact with the cone 36 slightly larger than the diameter at a corresponding plane of the cone 36. Such a construction causes the segments 22, 26 and 28 to ride upon the cone 36 with a slight rocking action. It prevents the contact between the two conical surfaces from occurring at the ends of the segments where the tendency for stress concentration is greatest.

Since the tongue 20 and groove 16 structure at the periphery of the sleeve 24 prevents relative rotation between the external telescoping member 12 and the sleeve 24, there can be no slippage at the peripheral surface of the sleeve 24 and therefore positive cam locking action is achieved and jamming of the mechanism cannot occur. Because of the frictional tendencies at this surface of sleeve 24 and member 12, the cross sectional dimensions of the tongue 20 and groove 16 construction need only be very small to satisfy strength requirements. Most of the torque is absorbed in the frictional contact between the periphery of the sleeve 24 and the external telescoping member 12. Thus because of this small strength requirement in the tongue and groove construction, it may successfully be applied to even relatively thin walled telescoping members 12 without impairing their strength.

Since there is no relative movement between the sleeve 24 and the external telescoping member 12 and since the locking will occur each time at the same position of the sleeve 24 on the cone 36, the relative angular displacement between the telescoping member 12 and the inner telescoping member 40 will always be substantially the same when the leg is locked. Thus, if a microphone or antenna or other device is attached to the telescoping member which is to be rotated for locking and unlocking, it will always return to the same angular position when the members are locked together after any selected adjustment. This is an advantage in the present construction in those instances where an attached device for proper utility must be positioned in a particular manner for use.

It will be noted that the diameter of the threaded portion 34 is greater than the maximum diameter of the cone 36. This construction effectively prevents the sleeve 24 from ever becoming separated from the spindle 38. No additional components for performing such a retaining function are required.

For unlocking the telescoping members 12 and 40, the members need only be rotated relatively to each other in the opposite direction from that described above for the locking operation. Such opposite relative rotation will cause the sleeve to ride down on the cone 36 so as to release the outward thrust of the cone surfaces. The particular direction for this relative rotation for the locking and unlocking operation can be selectably controlled by providing either a right or a left hand thread 34 whichever is desired.

In some instances, as where wear of a particular section as of a foot at the end of a telescoping member may occur, it may be desirable to have a clutch locking mechanism which permits relative rotation between the sleeve 24 and the external telescoping member 12 at suitable selected periods so as not to concentrate all the wear at one point on the foot. To satisfy such condition, applicant has provided a second embodiment of his invention illustrated in Figs. 3, 4 and 5. In this second embodiment, the essential difference lies in the construction of the sleeve. In this second embodiment a sleeve 50 is provided which has a construction substantially as that of the sleeve 24 at the internal threaded portion 52 and conical portion 54 corresponding with the threaded portions 34 and cone 36 of the spindle 38. However, in this embodiment the tongue 20 construction on the periphery of the sleeve has been eliminated in the sleeve 50. Two additional features have been added to sleeve 50 to avoid the possibilities of jamming in the locking mechanism which tends to occur without the tongue 20 construction. A circular spring element 56 is inserted in a retaining groove 58 located transversely to the axis of the sleeve 50. The spring 56 causes a continuous outward thrust of the segments 60, 62 and 64 of the sleeve 50 against the internal walls of the external telescoping member 12. The external telescoping member 12 need no longer have the groove 16 for this second embodiment. To further reduce the possibilities of jamming, a projection or shoulder 66 has been provided to extend in an axial direction at the end of the sleeve 50 nearest the flange 48 of the spindle 38. It will be noted that the shoulder 66 has a circumference substantially smaller than the peripheral circumference of the sleeve 50 for reasons which will be hereinafter described.

In operation of the second embodiment, the periphery of the sleeve 50 will always be in frictional contact with the internal wall of the external telescoping member 12. But the spring 56 is selected with a light radial thrust which will not produce a frictional contact sufficiently high to prevent easy axial sliding adjustment between the telescoping members 12 and 40. Since the sleeve 50 will always be maintained against the internal wall of the external member 12, there will be little or no frictional contact at the cone 36 and threaded portions 34 when the mechanism is in the unlocked condition. Also, it will be noted that for rotational movement the frictional contact at the periphery of the sleeve 50 will have a moment arm 68 which is substantially larger than the moment arm 70 at the cone 56 and threaded portion 52. It is also substantially larger than the moment arm 72 which would be caused by any friction at the end of the shoulder 66 and the flange 48. Therefore, even if the actual frictional force at the periphery of the sleeve 50 were the same as the frictional force at the cone 54, threaded portion 52 and the shoulder 66, there would still be no relative rotation between the sleeve 50 and the external telescoping member 12 because of the substantially larger moment arm 68. In actual practice, the friction at the periphery of the sleeve 50 will always be substantially larger than at the other three points mentioned because of the added outward thrust of the spring 56. The usual causes for jamming are either that the coefficient of friction at the contact periphery of the sleeve 50 has become smaller than that at the cone portion 54 and threaded portion 52 or that the shoulder 66 extends all the way or nearly to the outside periphery of the sleeve 50 in which case the moment arm 72 would be substantially the same as the moment arm 68. In applicant's second embodiment, the spring 56 compensates for the condition where even a lubricant happens to reduce the coefficient of friction at the surface of the periphery of the sleeve 50. Care has been taken in dimensioning the shoulder 66 so that the moment arm 72 is substantially smaller than the moment arm 68.

For obtaining relative rotation between the sleeve 50 and telescoping member 12 to adjust for wear concentration as mentioned above, the telescoping members are rotated in the unlocking direction until the shoulder 66 rides against the flange 48 at which point relative rotation in the unlocking direction may be obtained and the mechanism again locked at any selected extension adjustment of the telescoping members.

A third embodiment has been made for those applications where maximum strength at the locking mechanism is desired. It will be noted in Fig. 1 that for maximum extension of the telescoping members 12 and 40 the flange 48 will be positioned against the internally directed flange 18. In this extended position a bending load on the internal member 40 would be transmitted to the external member 12 through spindle 38. While the construction of the spindle 38 has sufficient strength for most use conditions, the reduced section of the cone 36 is a limiting factor in the strength of the lock mechanism construction. To satisfy even the severest use conditions, a third embodiment is provided and illustrated in Fig. 6.

In this third embodiment, a spindle 74 has been provided with reversed position of the cone 36 and threaded portion 34 so as to achieve a maximum cylindrical body dimension 76 for absorbing or withstanding transmitted bending moments between the telescoping members 12 and 40.

A flange 78 about the periphery of the spindle 74, together with the inwardly projecting flange 80 on the sleeve 82, prevents the sleeve 82 from being removed from the spindle 74 while in use. The sleeve 82 is segmented similarly to the sleeve 24 and has a tongue structure slidably fitted in the groove 16.

This invention is not limited to the particular construction shown as equivalents will suggest themselves to those skilled in the art.

What I claim is:

1. The combination of an outer member having an elongated cylindrical hollow portion open at one end, an inner member extending through said opening and free to rotate and slide axially in said cylindrical hollow portion, camming means in said cylindrical hollow portion rigidly fixed to said inner member, radially expansible segments in said hollow portion carried by said inner member in operative relation to said camming means, means responsive to a selective relative rotary movement between said members for bringing said camming means in forceable contact with said expansible segments whereby the latter will be moved radially by said camming means pressurably against said outer member, and means in radial relation to and continuously cooperating with at least one of said radially expansible segments for causing continuous radial engagement directly between said outer member and such radially expansible segment.

2. The combination as in claim 1 wherein said last mentioned means is a spring element positioned to continuously thrust said expansible segments outwardly against said outer member.

3. The combination as in claim 1 wherein said last mentioned means comprises an axially disposed tongue and groove structure between at least one of said expansible segments and said outer member.

4. The combination as in claim 1 wherein the last mentioned means comprises an axially disposed tongue on the periphery of one of said expansible segments and an axially disposed groove in the wall of said elongated cylindrical hollow portion, said tongue and groove being in slidable engagement with each other.

5. The combination with a hollow member having a substantially cylindrical internal wall, an elongated member longitudinally and rotatably movable within said hollow member, an axially aligned spindle extending from one end of said elongated member into said hollow member, an axially arranged threaded portion on said spindle, an axially disposed conical portion of smaller diameter than said threaded portion arranged between said threaded portion and elongated member, an axially segmented sleeve member having internal threaded and conical portions arranged in corresponding relation to the threaded and conical portions about said spindle, and projections on the segments of said sleeve member extending toward said elongated member and positioned radially inwardly a substantial distance from the periphery of said sleeve member.

6. The combination with a hollow member having a substantially cylindrical internal wall, an elongated member longitudinally and rotatably movable within said hollow member, an axially aligned spindle extending from an end of said elongated member into said hollow member, an axially arranged threaded portion on said spindle, an axially disposed conical portion of smaller diameter than said threaded portion arranged between said threaded portion and elongated member, an axially segmented sleeve member having internal threaded and conical portions arranged in corresponding relation to the threaded and conical portions about said spindle, and a circular spring element in said sleeve member disposed to expand the segments of said sleeve member radially against the internal wall of said hollow tubular member.

7. The combination as in claim 6 wherein said segments of said sleeve member have projections extending toward said elongated member and positioned radially inwardly a substantial distance from the periphery of said sleeve member.

8. The combination with a hollow member having a substantially cylindrical internal wall, an elongated member longitudinally and rotatably movable within said hollow member, an axially aligned spindle extending from an end of said elongated member into said hollow member, said spindle being fixed to said elongated member for rotation and longitudinal movement therewith, an axially arranged threaded portion on said spindle, an axially disposed conical portion of smaller diameter than said threaded portion arranged on said spindle between said threaded portion and elongated member, an axially segmented sleeve member having internal threaded and conical portions arranged in corresponding relation to the threaded and conical portions about said spindle, and an axially disposed tongue and groove structure between said sleeve member and cylindrical internal wall.

9. The combination with a hollow member having a substantially cylindrical internal wall, an elongated member longitudinally and rotatably movable within said hollow member, an axially aligned spindle extending from an end of said elongated member into said hollow member, an axially arranged threaded portion on said spindle, a radial projection about the periphery of said spindle between said threaded portion and said elongated member, an axially disposed conical portion of smaller diameter than said threaded portion arranged on the side of said threaded portion opposite said projection, an axially segmented sleeve member having internal threaded, conical and cylindrical recess portions arranged in corresponding relation to the threaded, conical and projection portions about said spindle, and means cooperating with said segmented sleeve for continuously maintaining radial engagement between said hollow member and said sleeve member.

References Cited in the file of this patent

UNITED STATES PATENTS

| | | |
|---|---|---|
| 730,599 | Bartley | June 9, 1903 |
| 2,409,075 | Starck | Oct. 8, 1946 |
| 2,490,369 | Neuwirth | Dec. 6, 1949 |
| 2,456,205 | Magder | Dec. 14, 1948 |
| 2,508,039 | Neuwirth | May 16, 1950 |
| 2,658,777 | Rauglas | Nov. 10, 1953 |